United States Patent [19]

Mathgen et al.

[11] Patent Number: 4,869,406
[45] Date of Patent: Sep. 26, 1989

[54] DISCHARGE CONTROL DEVICE

[75] Inventors: Georges Mathgen, Luxembourg; Charles Assa, Dondelange, both of Luxembourg

[73] Assignee: Paul Wurth S.A. and Arbed S.A., Luxembourg, Luxembourg

[21] Appl. No.: 268,424

[22] Filed: Nov. 8, 1988

[30] Foreign Application Priority Data

Nov. 12, 1987 [LU] Luxembourg .................... 87046

[51] Int. Cl.⁴ .............................................. B22D 37/00
[52] U.S. Cl. ....................................... 222/599; 65/325; 222/555
[58] Field of Search .............. 222/555, 594, 597, 598, 222/599; 65/129, 325

[56] References Cited

U.S. PATENT DOCUMENTS 1,512,373 10/1924 Soubier ................................ 65/325

FOREIGN PATENT DOCUMENTS

| 78760 | 5/1983 | European Pat. Off. | ............ 222/597 |
| 10928 | 4/1973 | Japan | ................................ 65/325 |
| 2082303 | 3/1982 | United Kingdom | ................ 266/271 |

*Primary Examiner*—Robert McDowell
*Attorney, Agent, or Firm*—Fishman, Dionne & Cantor

[57] ABSTRACT

A discharge control device is presented which includes a variable opening formed between two cylinders with parallel axes. The cylinders are mounted between two symmetrical support blocks having bores and are spaced at a distance equal to the sum of their radii. At least one of the cylinders has an external cut-out which, upon rotation of the two cylinders, defines the variable opening. The cylinders are in the form of discs with an axial thickness wherein the cut-out extends over the whole thickness. The discharge control device controls the flow of molten materials.

14 Claims, 6 Drawing Sheets

DISCHARGE CONTROL DEVICE

BACKGROUND OF THE INVENTION

The present invention relates to an apparatus which controls the discharge of a molten material. More particularly, the present invention relates to a control device for controlling the discharge of molten material by means of a variable opening, formed between two cylinders with parallel axes. The cylinders are mounted between two symmetrical support blocks having bores. The boxes are spaced at a distance equal to the sum of their radii. Each bore includes a means for turning the cylinders in opposite directions around their respective axes. At least one of the cylinders has an external cut-out which, in conjunction with the surface of the other cylinders and upon rotation of the two cylinders, defines the variable opening. The present invention also includes two refractory lateral plates positioned at each end of the two cylinders. The present invention is particularly well suited for use in a continuous casting plant.

The present invention is preferably used to control the discharge of molten material, such as steel, aluminium and other metals. However its use is not limited to molten metals, and it may be used in other fields concerned with controlling the discharge of pyroplastic materials, such as the glass industry, the extrusion of plastics, and the like.

Continuous casting plants require a control means to start, stop, and regulate the rate of flow of metal during the casting operation. The control means is generally located between a molten metal reservoir and ingot molds lying below it. Control means presently used in industry involve systems of closure which use a plug or a slider. These systems work by enlarging or restricting the cross section of a discharge orifice by gradually removing or inserting an object, such as a stopper or a plate, between the opening and the molten metal to be cast. These systems affect the flow geometry of the molten metal and only work well in the open or closed positions. In the intermediate positions, the flow is severely disturbed, which adversely affects the quality of the casting operation.

Another prior art method for controlling the flow of molten metals is disclosed in document EP-A No. 1.0078 760. This control means prevents the severe disturbances caused by the slide or Plug control means discussed above. This method comprises two cylinders with parallel areas which have a common line of contact. The cylinders are moved around their respective axes. At least one of the cylinders includes a peripheral groove which extends over a portion of the surface of the cylinder. The groove has a perpendicular orientation to the axis and has a depth which progressively changes between a minimum and a maximum. When the grooved cylinders are in a side by side orientation, and the grooves are aligned in a symmetrical fashion so as to define an opening, a system is created wherein rotation of the cylinders in opposite directions achieves a progressive variation of the cross section of the opening. While the cross sectional area of the opening decreases, the general shape of the opening remains much the same as the initial cross section. While former control means progressively cut off the flow, the method of EP-A No. 1.0078 760 progressively throttles the flow. Despite the fact that this method has achieved substantial advances relative to previous methods, it is still imperfect. Unfortunately, leakage often occurs on either side of the grooves of the cylinders. Also, it is difficult to avoid lateral discharge of the molten metal. Moreover, another problem that exists with the grooved cylinder method is that because the cylinders by necessity, are made of refractory materials they are weak. Often, the torque exerted by the drive shafts exceed the strength of the cylinders resulting in a breakdown.

SUMMARY OF THE INVENTION

The above discussed and other problems are deficiencies of the prior art are overcome or alleviated by the discharge control device of the present invention. The device of the present invention controls the flow of molten metals and like materials by progressively throttling the flow of these materials. The molten metals are discharged free of leakage, lateral discharge, and other problems incurred by the prior art.

One preferred embodiment of the present invention is characterized by cylinders in the form of discs. The cylinders have an axial thickness such that cut-outs extend over the whole thickness of the cylinders. Rotation of the cylinders can be accomplished by means which act on pinions attached to shafts which extend from the cylinders, or by means which act directly on the surface of the cylinders.

Preferably each cylinder has a cut-out made in a plane which is secant with respect to its circumference. Rotation of the cylinders will consequently cause progressive throttling of the molten flow by way of a rectangular section created by the cut-out.

In a first embodiment, each cylinder has a drive shaft which passes axially therethrough. The connection between the driveshaft and the cylinders is provided by two pairs of cheeks arranged on each of the shafts. The cheeks are applied from opposite sides of each of the cylinders, through openings in the lateral refractory plates.

At least one cheek for each cylinder is pressed resiliently against the cylinder. A Belleville spring is preferred to apply pressure to the resilient cheek.

The connections between each of the cheeks and the adjacent faces of a cylinder are preferably provided by a series of balls seated in hemispherical recesses in the faces of the cylinders and correspondingly hemispherical recesses in the cheeks.

Two support blocks and the lateral plates are located by means of Belleville springs in a metal housing through which the drive shafts pass.

The drive shafts can be mounted in bearings in the opposite walls of the housing. They may also be supported in a floating manner and connected to the axles of the drive pinions by cardan couplings.

In yet another embodiment of the present invention the cylinders are connected directly by cardan couplings to the drive shafts.

In still another embodiment of the present invention, the two cylinders are driven at their peripheries, at the side opposite to their cut-outs. In this embodiment, the two cylinders are arranged between two flat lateral plates.

The above-discussed and other features and advantages of the present invention will be apparent to and understood by those skilled in the art from the following detailed description and drawings.

BRIEF DESCRIPTION OF THE DRAWINGS

Referring now to the drawings wherein like elements are numbered alike in the several Figures.

DESCRIPTION OF THE INVENTION

Figure 1:
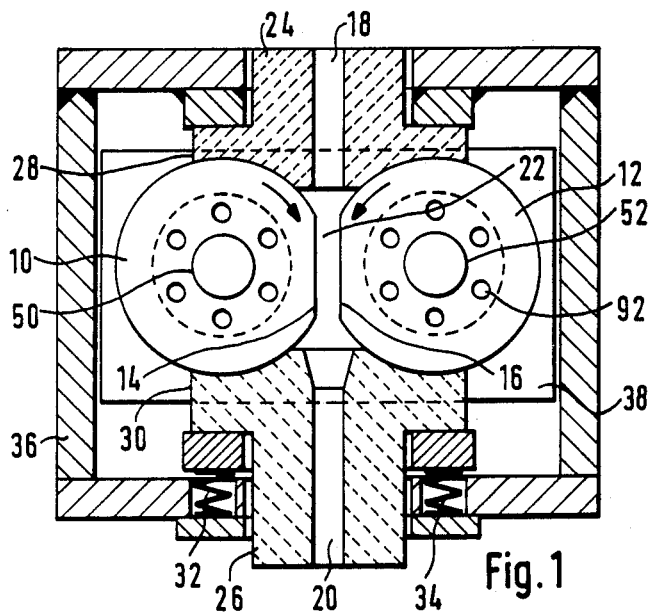
FIG. 1 is a vertical cross-sectional view of the discharge control means of the present invention.
Figure 2:
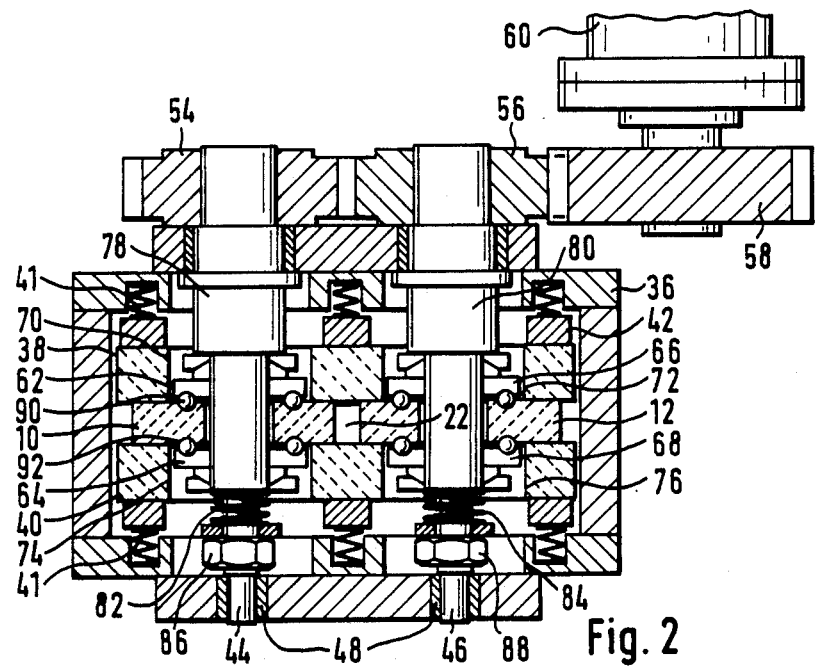
FIG. 2 is a horizontal cross sectional view of the discharge control means of FIG. 1.
Figure 3:
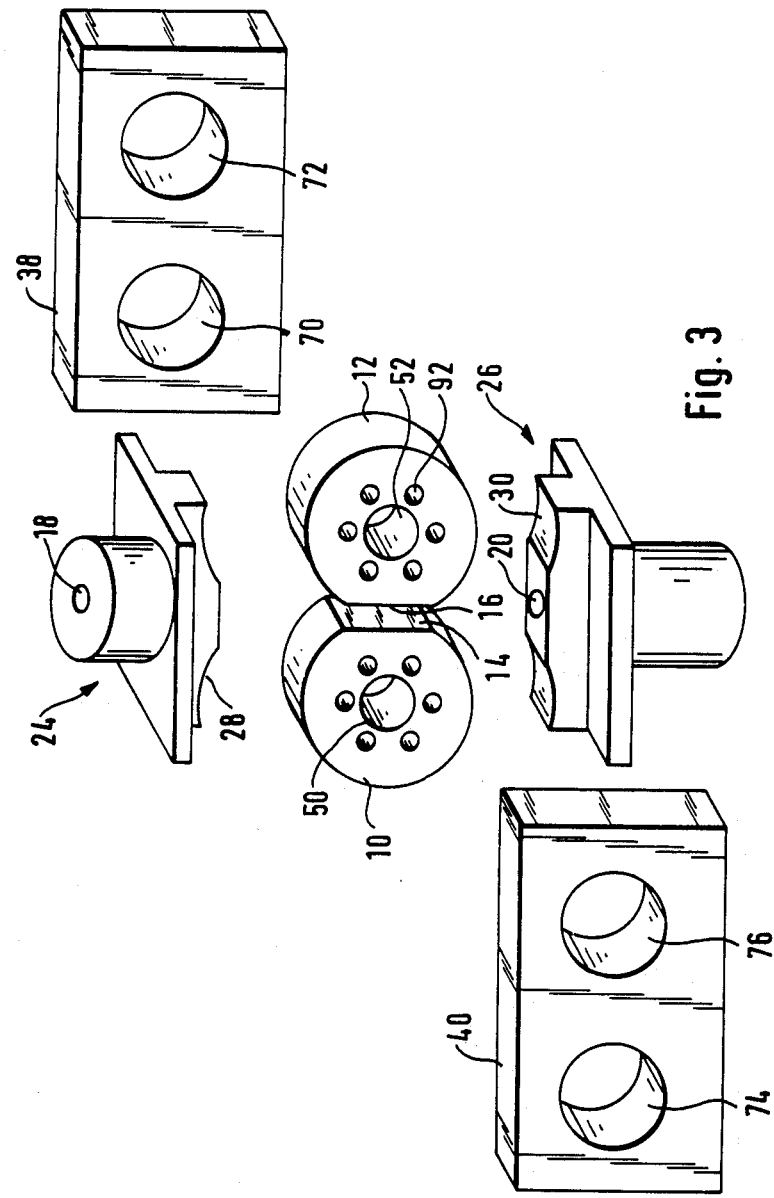
FIG. 3 is an exploded view of the discharge control means of FIG. 1.

Referring jointly to FIGS. 1 to 3, in accordance with the present invention the primary control members are constituted by two cylinders 10 and 12 arranged side by side in the form of discs. The axes of cylinders 10 and 12 are spaced at a distance corresponding to the sum of the radii of those cylinders. Each cylinder 10 and 12 includes a cut-out 14 and 16, respectively along a secant plane. Cut-outs 14 and 16 are aligned in parallel with one facing the other, as in FIGS. 1 and 3. Cut-outs 14 and 16 define a rectangular discharge opening 22 between an input passage 18 and an output passage 20. Rotation of cylinders 10 and 12, in the direction of the arrows in FIG. 1, progressively reduces the cross section of opening 22. Total closure occurs at the instant when the surfaces of cylinders 10 and 12 come into contact with each other. The shape of the cross section of opening 22 may be modified to provide an opening of circular cross section. This is accomplished by modifying the shape of cut-outs 14 and 16 in a known manner.

Cylinders 10 and 12 are housed between an upper refractory block 24 and a lower refractory block 26. Input and out-put passages 18 and 20 extend through blocks 24 and 26. The inner side of supports 24 and 26 have sliders 28 and 30, which fit against the circular surfaces of cylinders 10 and 12. Sliders 28 and 30 provide leak resistance in the circumferential direction. To further prevent leakage, supports 24 and 26 are held resiliently against the surfaces of cylinders 10 and 12 under the action of springs 32 and 34. A preferred spring is a Belleville type spring. Springs 32 and 34 abut against the wall of a metal housing 36 (in which cylinders 10 and 12 are housed) and against lower support 26. The spring force also urges cylinders 10 and 12 against upper supports 24.

In prior art discharge control means, the upper and lower supports include ridges which penetrate from both opposing sides the cut-outs of cylinders 10 and 12, along the full length of contact between cylinders 10 and 12. This design aids in resisting, lateral discharge of molten metal though it is ineffective. The prior art arrangement has been omitted in the discharge central means of the present invention. In the present invention, the axial length of the cylinders has been significantly reduced. Cut-outs 14 and 16 extend over the whole axial length of cylinders 10 and 12 of the present invention. Lateral discharge of molten metal is resisted in the present invention by two refractory lateral plates 38 and 40. Plates 38 and 40 are resiliently pressed against the end faces of cylinders 10 and 1 and the lateral surfaces of the sliders 28 and 30 of supports 24 and 26 (see particularly FIG. 2). The resilient engagement of plates 38 and 40 is provided by springs 41, abutting against the lateral walls of housing 36 and against plates 38 and 40, possibly via blocks 42 of refractory material.

Rotation of cylinders 10 and 12 is provided by two parallel drive shafts 44 and 46. Shafts 44 and 46 are mounted in bearings 48 found in the wall of housing 36. Shafts 44 and 46 pass through axial bores 50 and 52 into cylinders 10 and 12, without being directly in contact with cylinders 10 and 12. Shafts 44 and 46 are driven by two external pinions 54 and 56 in mutual mesh, one pinion being engaged by a pinion 58 operated by a motor-reduction unit 60. Other means for turning cylinders 10 and 12 in opposite directions may also be provided.

The connection between drive shafts 44 and 46 and cylinders 10 and 12 is provided by a plurality of cheeks 62, 64, 66 and 68 mounted on shafts 44 and 46. Cheeks 62, 64, 66 and 68 are located on both sides of cylinders 10, 12 in openings 70, 72 and 74, 76 in lateral plates 38 and 40. Cheeks 62 and 66 on the side of the driving pinions 54 and 56 are located in the axial direction by enlargements 78 and 80 of shafts 44 and 46. Cheeks 64 and 68 on the opposite side of pinions 54 and 56 are each urged under the action of a spring 82 and 84. Springs 82 and 84 can be washers of the Belleville type. Loading of springs 82 and 84 are provided by nuts 86 and 88 threaded onto shafts 44 and 46. Thus, cylinders 10 and 12 are resiliently trapped between two pairs of cheeks 62 and 64 and 66 and 68 which secures them to drive pinions 54 and 56. Lateral drive by the cheeks makes much less demand on the relatively vulnerable refractory material of discs 10 and 12, compared to an axial connection through the hubs of cylinders 10 and 12.

To resist the risks of skidding between cheeks 62, 64,66 and 68, cylinders 10 and 12, or to avoid having to tighten springs 82 and 84 too much, it is possible, as shown in FIG. 2, to supplement the resilient coupling between the cheeks and cylinders 10 and 12, by a set of balls 90. The seats in which balls 90 reside are constituted by a set of hemispherical recesses 92 in the lateral faces of discs 10 and 12 and a corresponding set of hemispherical recesses 94 in the adjacent faces of each of cheeks 62, 64, 66 and 68.

Figure 4:
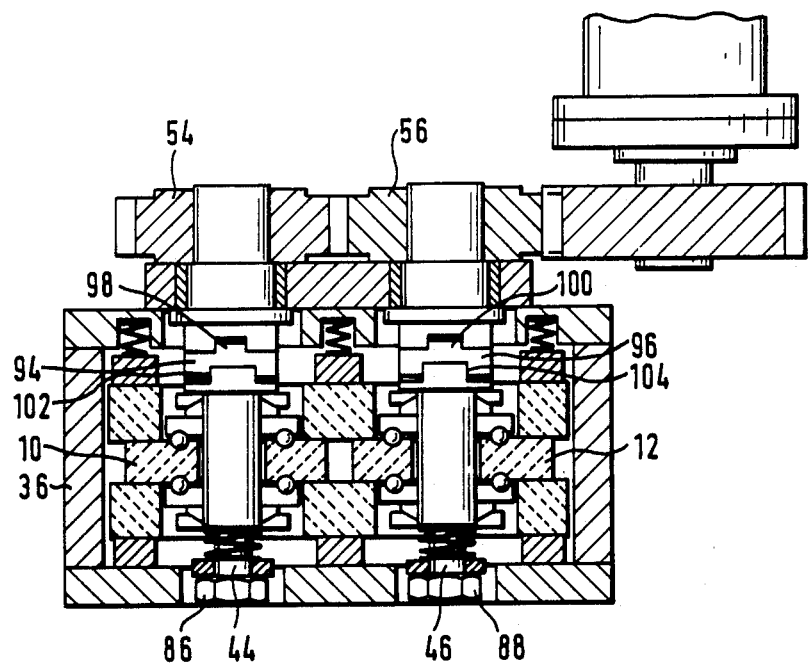
FIG. 4 is a horizontal cross-sectional view of an alternative embodiment of the discharge control means of FIG. 1.

It should be noted that all of the components are made of highly refractory material, particularly cylinders 10 and 12, supports 24 and 26, lateral plates 38 and 40, and are located via springs relative to the stationary component. The stationary components include housing 37 and drive shafts 44 and 46. The use of springs reduces the mechanical demands on these refractory components which have relatively low strength. An alternative embodiment, shown in FIG. 4 differs from the preferred embodiment shown in FIGS. 1 and 2 because shafts 4 and 46 are mounted in a floating manner, instead of being supported in a rigid manner in the bearings in housing 36. Thus, the discharge control means is automatically aligned in accordance with irregularities which can develop on the surfaces of cylinders 10 and 12. This further reduces the risks of blockage.

Floating support of shafts 44 and 46 is provided at enlargements 78 and 80 by cardan connections between shafts 44 and 46 and the axles of driving pinions 54 and 56. These cardans may each comprise a disc 94 and 96 which has on its faces a diametral rib 98 and 100. Ribs 98 and 100 are slidingly engaged in a corresponding groove in the adjacent face of the axle of pinions 54 and 56 and on the opposite face with a diametral groove 102 and 104 likewise slidingly engaged with a corresponding rib on the adjacent face of shafts 44 and 46. Grooves 102 and 104 can be parallel to ribs 98 and 100 or may be offset through a certain angle, for example 90 degrees. This set of grooves and ribs transmits the rotation of pinions 54 and 56 to shafts 44 and 46, while still permitting displacements of shafts 44 and 46 perpendicular to their axes, by mutual sliding of the grooves and ribs.

Figure 5:
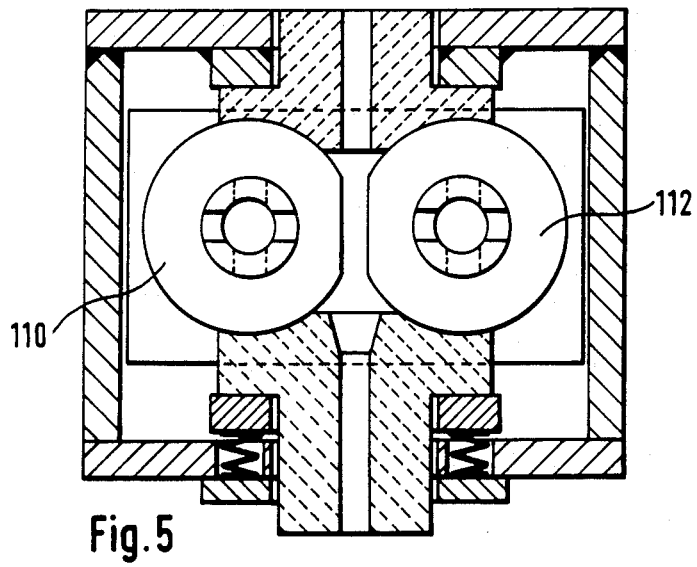
FIG. 5 is a vertical cross-sectional view of yet another alternative embodiment of the discharge control means of FIG. 1.
Figure 6:
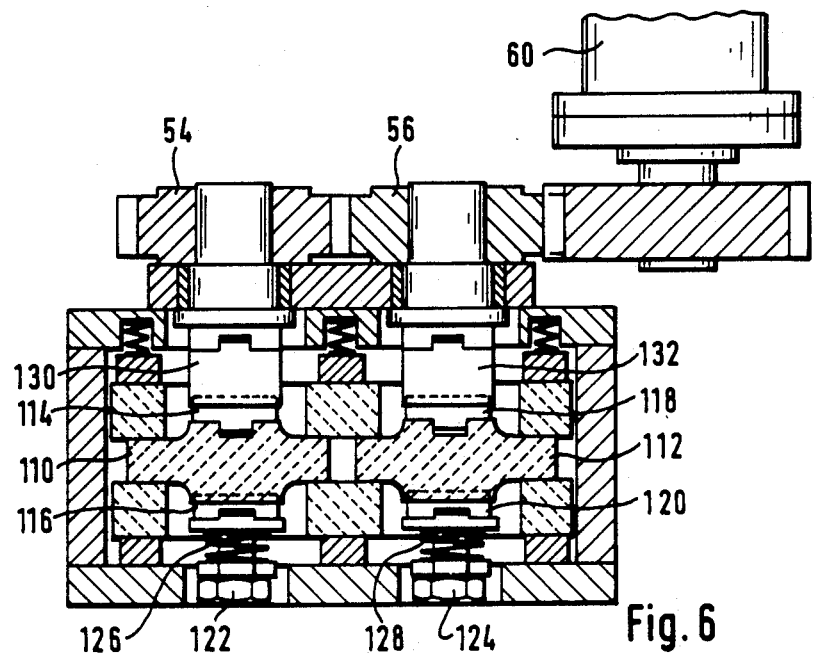
FIG. 6 is a horizontal cross-sectional view of the discharge control means of FIG. 5.

Yet another embodiment of the present invention is shown in FIGS. 5 and 6. This embodiment also uses floating mounting of cylinders 110 and 112, comparable to the embodiment of FIG. 4. However, the cheeks with ball connections are replaced by two pairs of cheeks 114, 116, 118 and 120 each having a diametral rib, engaged in a corresponding diametral groove at each side of cylinders 110 and 112. The grooves are preferably oriented perpendicular to one another and are made in a central enlargement of cylinders 110 and 112, so as not to weaken cylinders 110 and 112. Cheeks 114 and 118 on the side of the drive pinions 54 and 56 are fixed to rods 122 and 124 which pass along the axes of cylinders 110 and 112 as well as through opposed cheeks 116 and 120. Springs 126 and 128 are associated with loading nuts and enable resilient gripping of cheeks 114, 116, 118 and 120 against cylinders 110 and 112 as in the embodiment of FIG. 2. Cheeks 114 and 118 are connected to the axles of drive pinions 54 and 56 by cardan couplings 130 and 132 which are comparable to those of FIG. 4. These couplings permit displacements of cylinders 110 and 112 perpendicularly to the axes of drive Pinions 54 and 56 without interfering with rotary movements.

Figure 7:
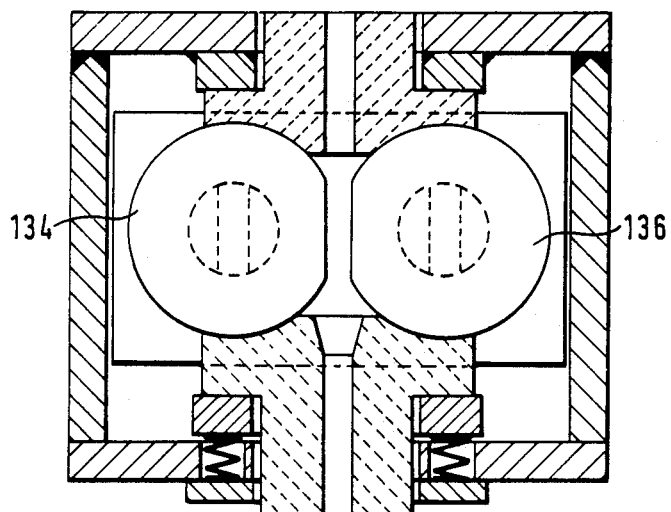
FIG. 7 is a vertical cross-sectional view of still another alternative embodiment of the discharge control means of FIG. 1.
Figure 8:
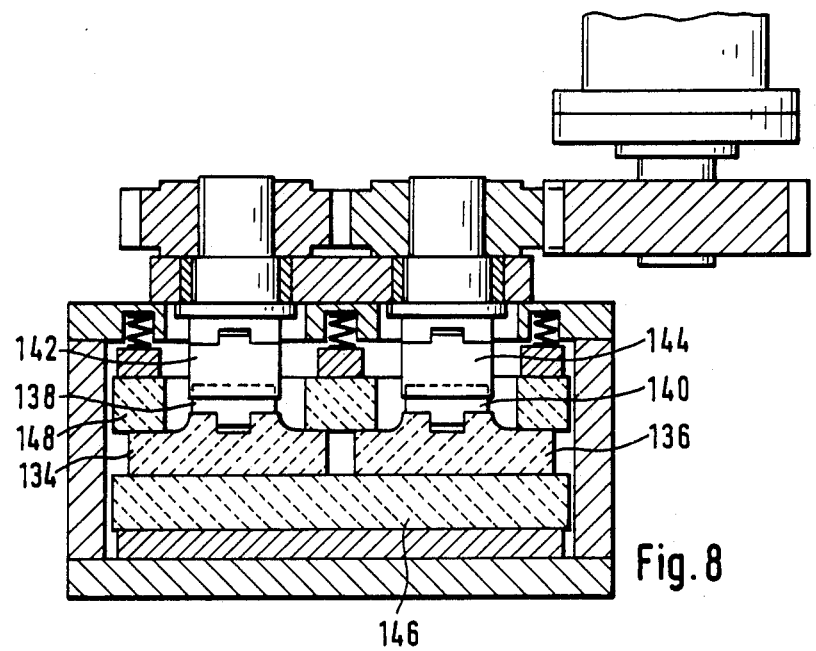
FIG. 8 is a horizontal cross-sectional view of the discharge control means of FIG. 7.

FIGS. 7 and 8 show a simplified version of the embodiment of FIGS. 5 and 6. In this embodiment, cylinders 134 and 136 no longer include any axial bore. Lateral cheeks 138 and 140, which are part of the cardan couplings 142 and 144, are associated with cylinders 134 and 136 in the same way as the cheeks 114 and 116 of FIG. 6 are associated with cylinders 110 and 112. However, cheeks 138 and 140 are not resiliently gripped by springs.

One of the features of the embodiment of FIGS. 7 and 8 is that lateral plate 146, associated with the cylinders 134 and 136 on the opposite side to that of the cardan couplings 142, 144 is a simple flat refractory plate. Plate 146 has no openings with which plate 148 must have to allow for coupling.

Figure 9:
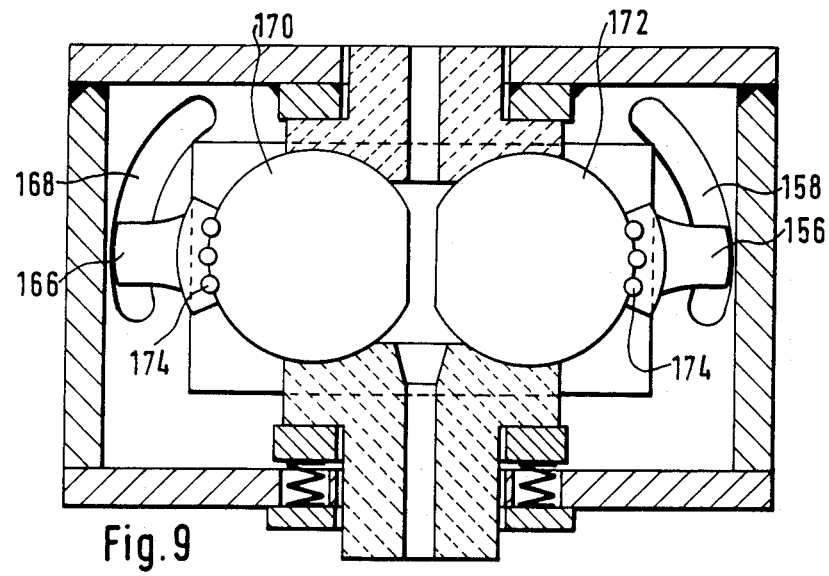
FIG. 9 is a vertical cross-sectional view of still another embodiment of the discharge control means of FIG. 1.
Figure 10:
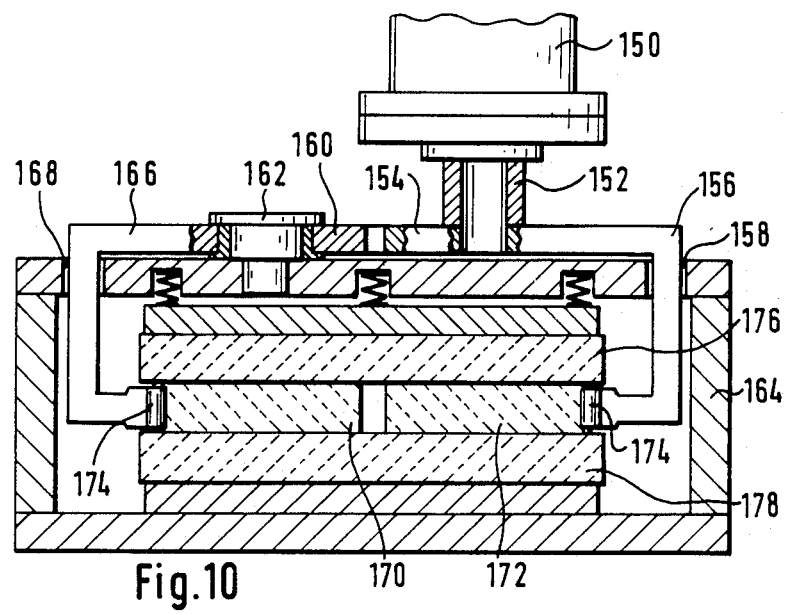
FIG. 10 is a horizontal cross-sectional view of the discharge control means of FIG. 9.

FIGS. 9 and 10 show still another embodiment of the present invention which is slightly different from the previous ones. The fundamental difference between this embodiment and the previous embodiments is that the cylinders are driven at their peripheries. For this purpose, an axle 152 of a motor 150 includes a toothed sector 154 which, on the side opposite axle 152, includes an arm in the shape of a "U" which passes through a arcuate slot 158 in the wall of a housing 164 into the interior of housing 164.

Toothed sector 154 acts on another sector 160 which can pivot about an axle 162 fixed to the wall of housing 164. On the side opposite axle 162, is found an attached arm 166 in the shape of a "U" which is symmetrical to arm 156 and which likewise passes through an arcuate slot 168 into the interior of housing 164.

In the interior of housing 164, arms 156 and 166 are respectively coupled to the outer surfaces of cylinders 170 and 172 on the side opposite to their cut-out (FIG. 9). This coupling can be carried out by known means. The preferred method is fashioned after the couplings between the cheeks and the cylinders of FIGS. 1 and 2 by means of anti-friction rollers 174 between arms 156 and 160 and cylinders 170 and 172.

To move from the open position of FIG. 9 towards a closed position, motor 150 is operated so as to make arms 156 and 166 pivot in synchronism and in opposite directions due to the intermeshing between toothed sectors 154 and 166. Arms 156 and 166 are lifted in their respective slots 158 and 168 by this movement and cause cylinders 170 and 172 to turn in opposite directions until the passage defined between their cut-outs disappears.

In the embodiment of FIGS. 9 and 10, the two lateral refractory plates 176 and 178 are plates without openings; similar to plate 14 of the embodiment of FIG. 8.

As in the previous embodiments, cylinders 170 and 172, are resiliently supported in the interior of housing 164 via springs.

Except for the embodiment of FIGS. 9 and 10, all of the cylinders may have a second cut-out which is diametrically opposed to the cut-out shown in the Figures. This second cut-out enables one to turn each cylinder around when it is worn at its first cut-out, and thus to prolong the period of use of each cylinder.

To damp out the thermal shocks to which the lateral plates on both sides of the cylinders are exposed at the start of each casting operation, the plates can be preheated. One method of preheating uses electric resistances embedded in the body of each of the plates.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A discharge control device for controlling the discharge of molten material through a variable opening formed between two cylinders with parallel axes the cylinders being spaced and mounted between two support blocks, the control device comprising:
    rotating means for rotating each of said cylinders about its respective axis, said rotating means acting on a surface of said cylinder;
    at least one external cut-out means located on at least one of said cylinders, wherein said cut-out means, upon rotation of said cylinder, defines said variable opening in conjunction with a surface of the other cylinder;
    refractory lateral plate means arranged on opposed sides of said cylinders to provide walls for said variable opening; and
    each of said cylinders further comprising discs having an axial length wherein said cut-out means extends over said entire axial length.

2. The control means of claim 1 wherein:
said cylinders are provided with said cut-out means made in a plane which is secant with respect to said cylinder circumference.

3. The control means of claim 1 wherein:
each of said cylinders are passed through axially by a drive shaft, said drive shafts being connected to said cylinders by a plurality of cheeks arranged on each of said shafts and urged against the lateral face of said cylinder through openings in said refractory lateral plates.

4. The control means of claim 3 including:
support means comprising carbon couplings for supporting said shafts in a floating manner, said shifts being connected to the axles of driving pinions by said cardan couplings.

5. The control means of claim 4 wherein said support means further comprises:
said cylinders being resiliently held between two pairs of said cheeks by means of diametral fibs and complementary grooves, one pair of said cheeks being part of said cardan coupling.

6. The control means of claim 3 wherein:
at least one of said cheeks for each of said cylinders is resiliently pressed against said cylinder.

7. The control means of claim 6 wherein:
said resilient connection between said cheeks and face of said cylinders is supplemented by a set of balls seated in a set of hemispherical recesses in the faces of said cylinders and a corresponding set of hemispherical recessing in the adjacent faces of said cheeks.

8. The control means of claim 6 wherein:
said cheeks resiliently pressed against said cylinders are subjected to the action of a spring secured on said drive shafts.

9. The control means of claim 8 wherein:
said spring is a Belleville type spring.

10. The control means of claim 1 wherein: within a metal housing, through which said drive shafts pass, said blocks and said plates being attached to said housing by means of springs.

11. The control means of claim 10 wherein:
said shafts are mounted in bearings in said housing.

12. The control means of claim 1 wherein:
said cylinders are supported on one side by a flat refractory lateral plate and are driven at the opposite side by means of a cardan coupling acting on said cylinders through said cheeks which are in engagement with said cylinders by diametral ribs and complementary grooves.

13. The control means of claim 1 wherein:
said cylinders are driven at their peripheries, at the side diametrically opposed to said cut-out means by pivoting arms extending into said housing through arcuate slots.

14. The control means of claim 1 wherein:
said lateral refractory plates include heating elements for preheating said plates.

* * * * *